United States Patent [19]
Hofmiller

[11] Patent Number: 5,802,980
[45] Date of Patent: Sep. 8, 1998

[54] VEHICLE DRIVE SYSTEM FOR ROAD AND RAILROAD TRACK

[75] Inventor: Richard J. Hofmiller, Orange, Conn.

[73] Assignee: DFM Enterprises, Inc., North Haven, Conn.

[21] Appl. No.: 833,421

[22] Filed: Apr. 7, 1997

[51] Int. Cl.[6] .................................................. B61C 13/00
[52] U.S. Cl. ..................................... 105/72.2; 105/215.2
[58] Field of Search ............................... 105/26.1, 215.1, 105/215.2, 72.2

[56] References Cited

U.S. PATENT DOCUMENTS

| | | | |
|---|---|---|---|
| 1,512,755 | 10/1924 | Galbraith | 105/215.2 |
| 1,937,532 | 12/1933 | Ronk | 105/72.2 |
| 3,134,343 | 5/1964 | Matsumura . | |
| 3,179,066 | 4/1965 | Koshobo . | |
| 3,198,137 | 8/1965 | White, Jr. . | |
| 3,892,187 | 7/1975 | White, Jr. . | |
| 4,048,925 | 9/1977 | Storm . | |
| 4,372,220 | 2/1983 | Sechi . | |
| 4,488,494 | 12/1984 | Powell, Sr. . | |
| 4,520,735 | 6/1985 | Field . | |
| 4,537,137 | 8/1985 | White, Jr. . | |
| 4,583,465 | 4/1986 | Powell, Sr. . | |
| 4,828,452 | 5/1989 | Bolitho | 105/72.2 |
| 4,878,436 | 11/1989 | Lich et al. | 105/72.2 |
| 5,016,544 | 5/1991 | Woollam | 105/215.2 |
| 5,642,673 | 7/1997 | Lucky, Sr. | 105/72.2 |

FOREIGN PATENT DOCUMENTS

| | | |
|---|---|---|
| 1100072 | 2/1961 | Germany . |
| 2052406 | 1/1981 | United Kingdom . |

*Primary Examiner*—S. Joseph Morano
*Attorney, Agent, or Firm*—Sterne, Kessler, Goldstein & Fox P.L.L.C.

[57] ABSTRACT

A vehicle for operation on both road and railroad track (off road) is provided with a wheeled chassis comprising a steered front wheel axle and rear wheel differential axle(s), all with road or rubber tire wheels. A front axle and a rear wheel differential axle(s) are provided with rail wheels, the rear rail wheel axle(s) being suspended horizontally behind the rear most tired axle(s) of the wheel chassis. The rail wheel differential axle(s) are horizontally displaceable to be moved into engagement with the railroad track during the lifting of adjacent road or rubber tire wheels out of engagement with the ground. The rear rail wheel differential axle(s) is located behind the rear most wheel axle(s) for road or rubber tire wheels of the vehicle and is being driven by the rubber tire vehicles differential in front of it. The rail differential axle(s) also incorporates a link suspension system including an engagement mechanism permanently secured to the rear part of the vehicle. In conjunction with this rail drive system a holding device including an anti axle dive system is to be installed on the rear road or rubber tire wheel suspension system so that it holds the suspension system and axle(s) at a fixed dimension when the steel wheel differential axle(s) is engaged with the rail and lifts the road or rubber tired axle(s) and suspension system out of engagement with the ground. The above application may be reversed so that the steel rail wheel axle(s) are in front of the road or rubber tire wheel axle(s).

8 Claims, 5 Drawing Sheets

VEHICLE DRIVE SYSTEM FOR ROAD AND RAILROAD TRACK

BACKGROUND OF THE INVENTION

1. Field of the Invention

This invention relates to a vehicle for operation on both road and railroad track and more particularly to an improvement in propelling such a vehicle over railroad track.

2. Related Art

Numerous arrangements of vehicles which operate on both road and railroad track are know in the art. Common to many of these arrangements is the use of a set of front and rear wheel axles, with road or rubber tires, and another set of front and rear wheel axles, with rail wheels. In the typical arrangement, the front and rear rail wheels are disposed slightly behind the respective front and rear road wheels. During road or highway operation, the rail wheels are suspended above the ground from the chassis of the vehicle. When the rail mode is desired, the rail wheels are lowered into engagement with the railroad track, thereby lifting the road wheels off of the ground. This allows for a vehicle which can be used on roads and highways, while also being convertible for use on railroad track. Vehicles of this kind are previously known as described in U.S. Pat. Nos. 4,048,925; 4,520,735; 3,134,343; and 3,179,066.

Because the road wheels are out of engagement with the ground or railroad track when vehicles of this type are in the rail mode, the rail wheels must be powered in order to propel the vehicle along a railroad track. U.S. Pat. Nos. 4,048,925 and 4,520,735 both disclose the use of a hydraulic motor and drive system, running off the main engine, to drive the rail wheels. In these arrangements, when the rail mode is desired, the road mode transmission is disengaged and the vehicle engine is directly connected to the hydraulic motor which powers the rail wheels. A disadvantage of arrangements of this type is that additional costs are incurred through the need for a separate hydraulic drive system.

An alternative solution to the problem of powering the rail wheels is disclosed in U.S. Pat. Nos. 3,134,343 and 3,179,066 which teach the use of two separate drive shafts extending from the engine of the vehicle, one for transmitting power to the road wheels and the other for transmitting power to the rail wheels. In these arrangements, driving power is distributed alternatively to either the road wheels or rail wheels, depending on the desired mode of operation. The disadvantage of this arrangement, however, is that when a highway vehicle is desired which requires a tandem rear road wheel arrangement (as is often required by law when heavy loads are carried), it becomes difficult to extend the rail wheel drive shaft past the tandem wheels to connect with the rear rail wheel differential. The crowding that occurs at the rear end of the vehicle in such a tandem rear wheel arrangement and the need for the rail wheels to be able to raise and lower when switching between road and rail modes make the use of a lengthy rail wheel shaft difficult if not impossible.

In the present invention, an improved rail wheel drive system is disclosed which overcomes the limitations of the above conventional techniques.

SUMMARY OF THE INVENTION

According to the invention there is a more efficient way of propelling a vehicle for operation on both road and railroad track. The vehicle is provided with a wheeled chassis comprising a steered first front wheel axle, a first rear wheel differential axle, a second front wheel axle, and a second rear wheel differential axle. Road wheels are rotably mounted on the steered first front wheel axle and the first rear wheel differential axle, and rail wheels are rotably mounted on the second front wheel axle and the second rear wheel differential axle. In the road mode, the vehicle chassis is supported by the road wheels disposed on the steered first front wheel axle and the first rear differential axle, while the rail wheels mounted on the second front wheel axle and the second rear wheel axle are horizontally suspended from the chassis. In the rail mode, on the other hand, the rail wheels are extended so as to engage with the railroad track and the road wheels are lifted off of the ground. A drive shaft is disposed between the output of the first rear wheel differential and the input of the second rear wheel differential and the second rear wheel differential axle is driven by the first rear wheel differential axle through the drive shaft when the vehicle is being driven on the railroad track.

Alternatively, the vehicle can be provided with a wheeled chassis comprising a steered first front wheel axle, a first rear wheel differential axle, a second front wheel axle, a second rear wheel differential axle, and a third rear wheel differential axle, where the third rear wheel differential axle is disposed between the first rear wheel differential axle and the second rear wheel differential axle. Road wheels are rotably mounted on the steered first front wheel axle, the first rear wheel differential axle and the third rear wheel differential axle, and rail wheels are rotably mounted on the second front wheel axle and the second rear wheel differential axle. In the road mode, the vehicle chassis is supported by the road wheels disposed on the steered front wheel axle and the first and third rear wheel differential axles, while the rail wheels mounted on the second front wheel axle and the second rear wheel axle are horizontally suspended from the chassis. In the rail mode, on the other hand, the rail wheels are extended so as to engage with the railroad track and the road wheels are lifted off of the ground. A drive shaft is disposed between the output of the third rear wheel differential and the input of the second rear wheel differential and the second rear wheel differential axle is driven by the third rear wheel differential axle through the drive shaft when the vehicle is being driven on the railroad track. A holding means, such as a spring lock-out hook, must be employed at the rear of the vehicle to maintain the first and third rear wheel differential axles at a predetermined distance from the chassis during the rail mode and thereby minimize the angular movement of the universal joint at the output of the third rear wheel differential axle. Additionally, a anti-dive spring may be incorporated into the spring stack of the suspension system for the rear road wheels, in order to keep the rear road wheels horizontally level during heavy breaking and acceleration of the vehicle in the rail mode.

BRIEF DESCRIPTION OF THE FIGURES

An embodiment of the invention will be described in accordance with the following drawing figures, in which similar reference numbers are used to describe similar elements.

DETAILED DESCRIPTION OF THE PREFERRED EMBODIMENTS

Figure 1:
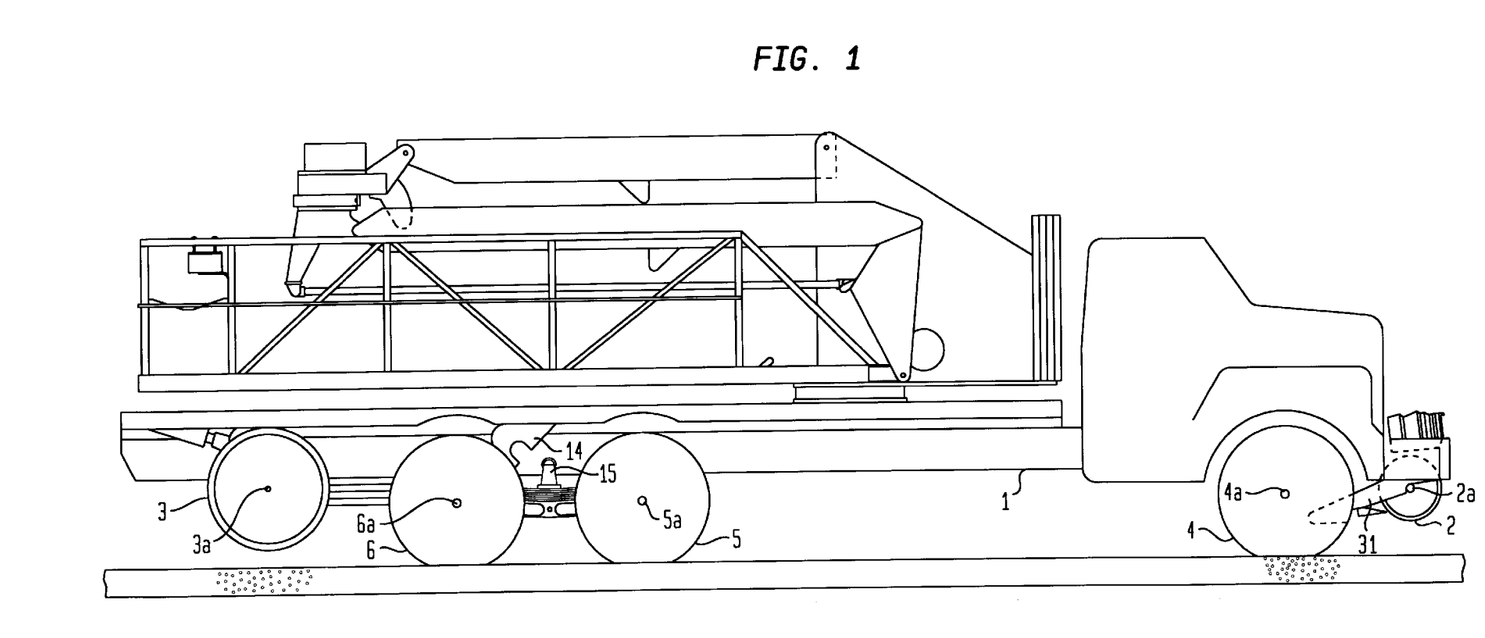
FIG. 1 is a side view of a vehicle according to the present invention with an open work platform for bridge maintenance, where the vehicle is in road mode, so that the rail wheels are suspended horizontally from the chassis and the road or rubber wheels are engaged with the ground.
Figure 2:
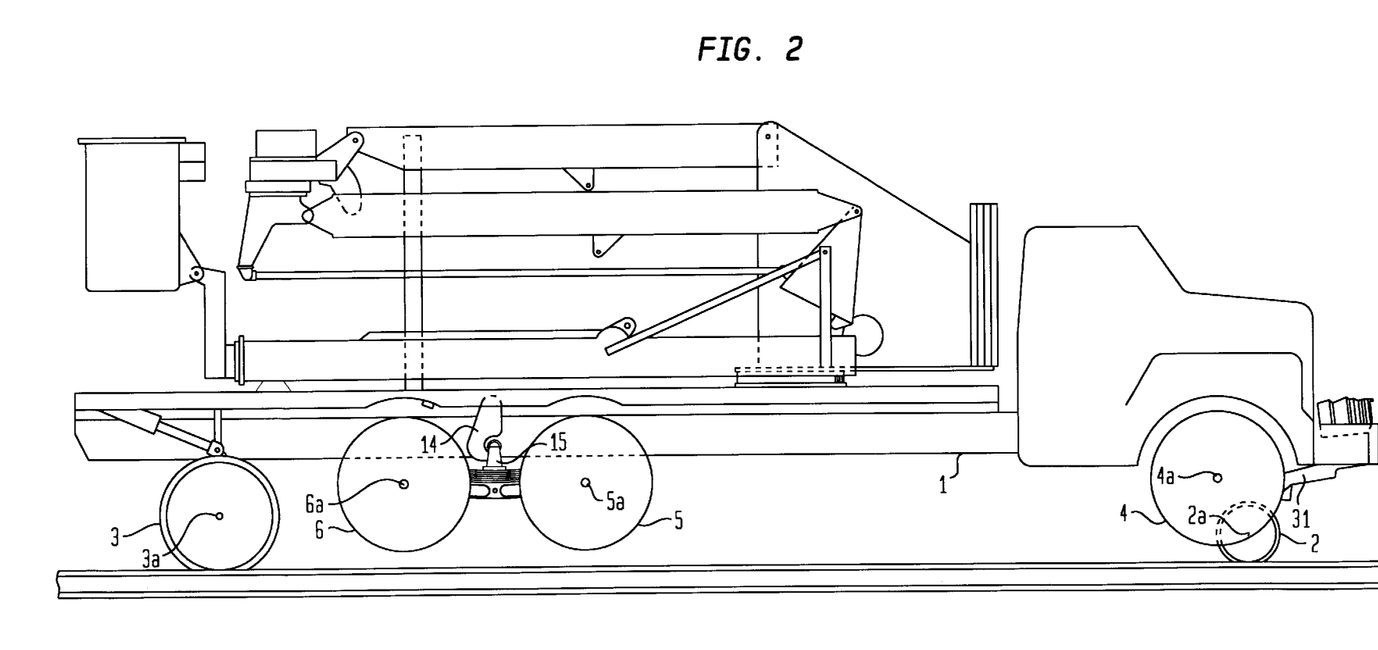
FIG. 2 is a side view of a vehicle according to the present invention with an enclosed work platform for underbridge inspection, where the vehicle is in rail mode, so that the rail wheels are engaged with the rail road track and the road or rubber wheels are lifted out of engagement with the ground.

FIGS. 1 and 2 both show a vehicle according to the present invention. The vehicle could be one designed for bridge work, such as one with an open work platform for bridge maintenance as shown in FIG. 1 or with an enclosed work platform for underbridge inspection as in FIG. 2, but the present invention is not limited to bridge work vehicles. More generally, this invention is directed to any vehicle for which operation on roads and highways as well as on railroad track is desired. A preexisting road vehicle can be converted to a vehicle according to the present invention rather easily or a vehicle can be designed specifically in accordance with this invention. Additionally, while a vehicle with tandem rear road or rubber wheel axles is shown in FIGS. 1 and 2 and described below, this invention is also directed to vehicles having only one rear road or rubber wheel axle. Similarly, while the road or rubber wheel axles 5a, 6a are disposed in front of the adjacent steel rail wheel axle 3a on the vehicle shown in FIGS. 1 and 2 and described below, the present application may be reversed so that the steel rail wheel axle is disposed in front of the adjacent road or rubber wheel axles.

As can be seen in FIG. 1, in the road mode position, vehicle chassis 1 rests on front road or rubber wheels 4 and rear road or rubber wheels 5,6. Front road or rubber wheels 4 are rotably mounted on front road or rubber wheel axle 4a and rear road or rubber wheels 5,6 are rotably mounted on rear road or rubber wheel axles 5a, 6a, respectively. Front steel rail wheels 2 and rear steel rail wheels 3 are suspended above the ground from chassis 1 as discussed below. Front steel rail wheels 2 are rotably mounted on front steel rail wheel axle 2a and rear steel rail wheels 3 are rotably mounted on rear steel rail wheel axle 3a.

In the rail mode position, on the other hand, as shown in FIG. 2, vehicle chassis 1 rests on front steel rail wheels 2 and rear steel rail wheels 3. Front road or rubber wheels 4 and rear road or rubber wheels 5,6 are lifted off the ground. Anti-dive spring 29 and spring lock-out hook 14 (FIG. 4) are used to maintain rear road or rubber wheels 5,6 level and at predetermined distance 16 from chassis 1, as discussed below. Predetermined distance 16 corresponds to the desired vehicle riding height, measured from the bottom of the frame of chassis 1 to the center of rear road or rubber wheel 5. In the rail mode position, rear steel rail wheels 3 are driven through rear steel rail wheel differential 3b, which is driven by rear road or rubber wheel differential 6b, through rail wheel drive shaft 12, as discussed below, with reference to FIG. 5.

As shown in FIGS. 1 and 2, front steel rail wheels 2 are rotably mounted to front steel rail wheel axle 2a and are disposed at the front of the vehicle by a rail wheel conversion means known in the art, such as that disclosed in U.S. Pat. No. 4,488,494, incorporated herein in its entirety by reference. According to U.S. Pat. No. 4,488,494, support arm 31 is fixed at the front of the vehicle from which front steel rail wheels 2 and front steel rail wheel axle 2a are pivotally attached. Through the use of a drive mechanism, typically a hydraulic cylinder (not shown), front steel rail wheels 2 can be rotated from a raised position, FIG. 1, to a position of engagement with the railroad track, FIG. 2.

Figure 3:
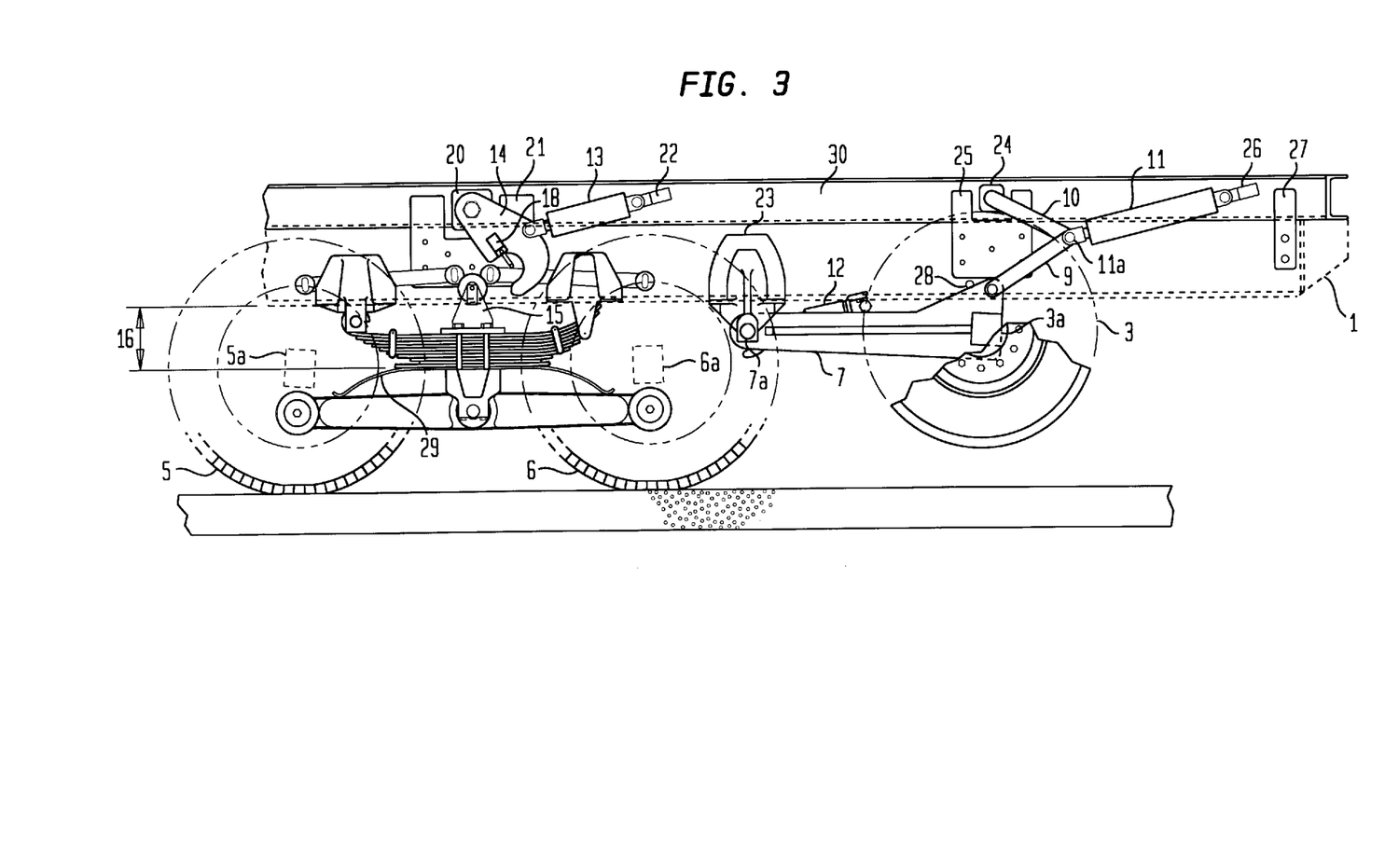
FIG. 3 is a partial side view of a vehicle according to the present invention focusing on the rear road and rail axles and rear road suspension system, where the spring lock-out hook is disengaged and the road or rubber wheels are engaged with the ground, while the rear rail wheels are suspended horizontally from the vehicle chassis.
Figure 4:
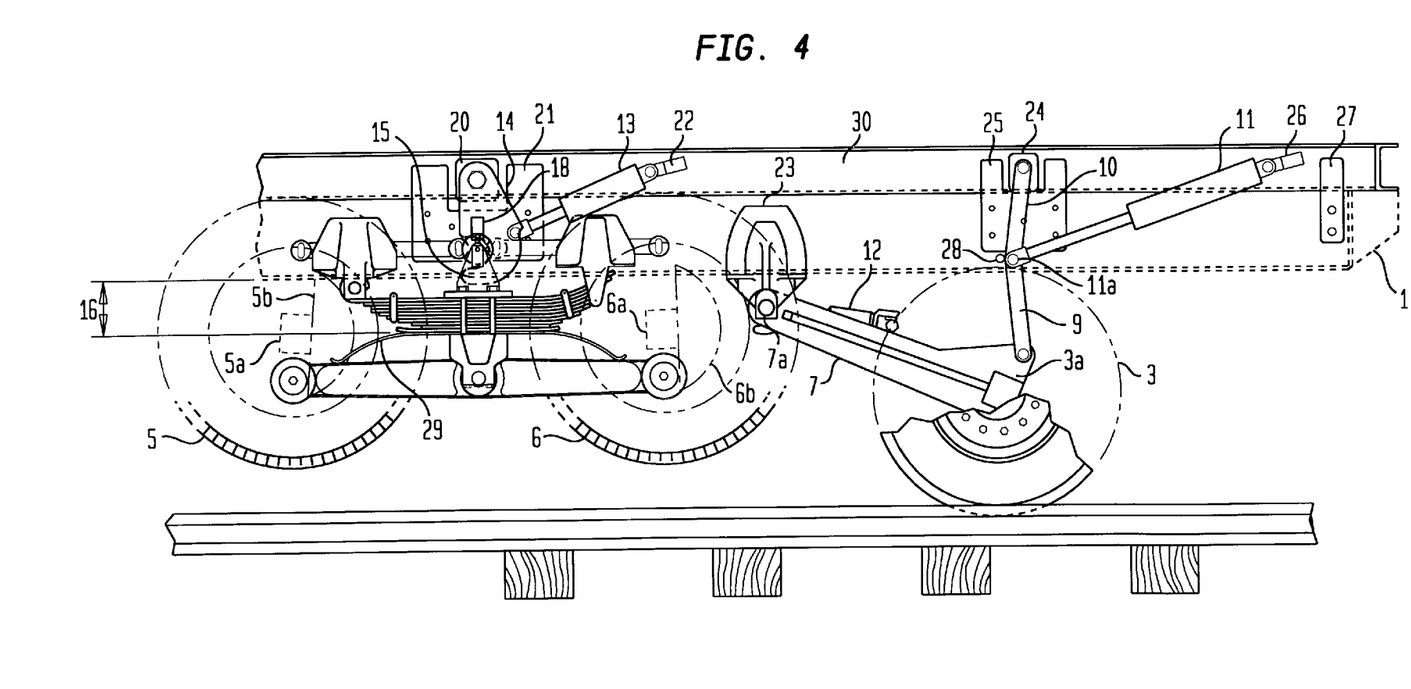
FIG. 4 is a partial side view of a vehicle according to the present invention focusing on the rear road and rail axles and rear road suspension system, where the spring lock-out hook is engaged, thereby holding the rear road or rubber wheels above the ground, while the rear rail wheels are engaged with the railroad track.

As shown in FIGS. 3 and 4, rear steel rail wheels 3 are rotably mounted to rear steel rail wheel axle 3a and are disposed at the rear of the vehicle through the use of trailing arm 7 and links 9,10. To facilitate the addition of rear steel rail wheels 3, trailing arm 7, and links 9,10 to the rear of the vehicle, deck 30 can be mounted on top of chassis 1 through the use of a plurality of attach plates, including attach plates 21, 25, and 27, as shown in FIGS. 3 and 4. On the other hand, deck 30 may not be necessary where equipment has already been mounted to the vehicle and a similar deck or platform is already in place on top of chassis 1, to which mount blocks 20, 22, 24, and 26 can be fixed.

Trailing arm 7 is pivotally attached at one end, to trailing arm support 23 at pivot 7a, and at the other end to rear steel rail wheel axle 3a. Link 9 is pivotally attached at one end to trailing arm 7 and link 10 is pivotally attached at one end to mount block 24. The other ends of link 9 and link 10 are joined at pivot point 11a. Drive mechanism 11, which may be a hydraulic cylinder as shown, is pivotally attached at one end to deck 30, at mount block 26, and is joined at the other end to links 9,10 at pivot point 11a. By extending and retracting drive mechanism 11 in a conventional fashion and thereby moving links 9, 10, trailing arm 7 is raised and lowered so that rear steel rail wheels 3 can be moved up and down.

Figure 5:
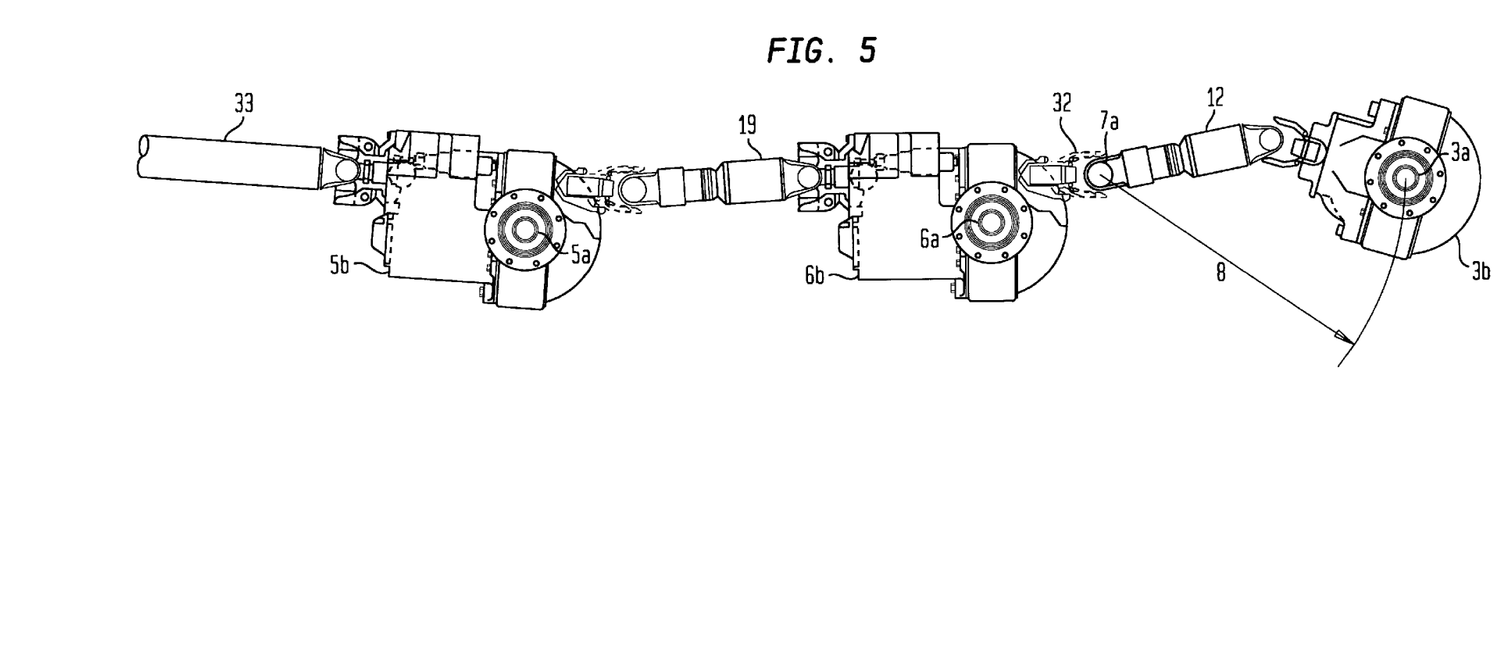
FIG. 5 is a cutaway side view of a vehicle according to the present invention focusing on the rear road and rail axles and differential assemblies as they would be viewed in their respective positions as shown in FIG. 3, with suspension, wheels and linkages removed.

FIGS. 3 and 4 show a typical vehicle suspension system for rear road or rubber wheels 5,6. Additionally, FIGS. 3 and 4 show spring lock-out hook 14 according to this invention. Spring lock-out hook 14 is pivotally attached to deck 30, at mount block 20, and is driven by drive mechanism 13, which could be a hydraulic cylinder. Drive mechanism 13 is pivotally attached at one end to spring lock-out hook 14, at pivot 13a, and at the other end to mount block 22. When spring lock-out hook 14 is engaged to bolster 15 (FIG. 4) it holds the vehicle ridding height at a predetermined distance 16 from chassis 1. As shown in FIG. 5, this sets the location of universal joint 32, holding it in a level horizontal position to keep the extreme angular velocities of universal joint 32, which drives rear steel rail wheel differential 3b through rail wheel drive shaft 12, at a minimum, as discussed below. Additionally, by lifting rear road or rubber wheels 5,6 off or out of engagement with the ground, the vertical center of gravity is lowered, making the vehicle with this type of equipment more stable. This is especially important where the vehicle is used in conjunction with a crane or man carrying device, such as would be done for overhead or under bridge inspection and maintenance, as this type of vehicle usually does not have outriggers for additional stability support.

During rail mode operation, rear steel rail wheels 3 are driven by the vehicle engine through rear steel rail wheel differential 3b. As shown in FIG. 5, rear steel rail wheel axle 3a and rear steel rail wheel differential 3b are powered by rail wheel drive shaft 12, which is drivingly connected to rear road or rubber wheel differential 6b, disposed directly in front of rear steel rail wheel differential 3b. In turn, rear road or rubber wheel differential 6b is powered by drive shaft 19, which is drivingly connected to rear road or rubber wheel differential 5b, disposed directly in front of rear road or rubber wheel differential 6b. Rear road or rubber wheel differential 5b is powered by drive shaft 33, which transfers power from the vehicle engine. When spring lock-out hook 14 is engaged, universal joint 32 at the output of rear road or rubber differential 6b is held in a level horizontal position to keep the extreme angular velocities of universal joint 32, which drives rear steel rail wheel differential 3b through rail wheel drive shaft 12, at a minimum, despite the rotation of rail wheel drive shaft 12 along arc 8 during conversion between road and rail modes. By minimizing the angular velocities of universal joint 32, wear on universal joint 32 is reduced. This arrangement allows rear steel rail wheel differential 3b to be driven through a simple connection with rear road or rubber wheel differential 6b directly in front of it and avoids the need for separate power units or lengthy drive shafts.

Additionally, this arrangement allows for an existing road vehicle to be easily converted for road/rail use according to this invention. Such a conversion would simply require removing the preexisting rearmost rear road or rubber wheel differential and replacing it with rear road or rubber wheel differential 6b, identical to rear road or rubber wheel differential 5b, which has both an input and an output shaft, and then reconnecting the preexisting rearmost rear road or rubber wheel differential, this time to the output shaft of rear road or rubber wheel differential 6b, so as to act as rear steel rail wheel differential 3b, as shown in FIG., 5.

If any difference exists between the rolling radius of rear road or rubber wheels 5,6 when on the road and the rolling radius of rear steel rail wheels 3 when on the railroad track, an adjustment to the ratio of rear steel rail wheel differential 3b must be made so that the vehicle's speedometer will read correctly. One way this could be done would be to pick standard commercially available gears for rear steel rail wheel differential 3b and machine the diameter of rear steel rail wheels 3 to the required size. Proper working of the vehicle's speedometer is necessary in order to keep accurate records of the vehicle's mileage for warranty and scheduled periodic maintenance purposes.

Since rear road or rubber wheel differentials 5b, 6b are powered during the rail mode, the braking and acceleration of rear steel rail wheels 3 can be accomplished through rear road or rubber wheel axles 5a, 6a and rear road or rubber wheel differentials 5b, 6b. On the other hand, if required, an independent or additional braking system could be employed for braking rear steel rail wheels 3. To help maintain rear road or rubber wheels 5,6 horizontally level in the rail mode during heavy breaking and acceleration, an anti-dive spring 29, which may be a leaf spring as shown, can be incorporated in the conventional spring stack of the vehicle's suspension. During the rail mode, rear road or rubber wheels 5,6 are suspended from chassis 1 as discussed above. In this arrangement, as there is nothing beneath rear road or rubber wheels 5,6 to restrict their movement, rear road or rubber wheels 5,6 are prone to rock forward and backward in response to heavy breaking and acceleration. This rocking response causes rear road or rubber wheels 5 to dive, to fall below a level horizontal alignment when looked at from the side, in response to heavy breaking and causes rear road or rubber wheels 6 to dive, to fall below a level horizontal alignment when looked at from the side, in response to heavy acceleration. Anti-dive spring 29 provides a balancing force acting on rear road or rubber wheel axles 5a, 6a to keep rear road or rubber wheels 5 from diving in response to the forces acting on the vehicle during heavy breaking and to keep rear road or rubber wheels 6 from diving in response to heavy acceleration.

In use, the transfer of the vehicle from road to rail will be done at a location where the vehicle can be approximately positioned perpendicular to the railroad track. A plate or foot (not shown) liftable and lowerable approximately beneath the center of gravity of the vehicle will lift the vehicle to permit its turning about a vertical axis. The plate or foot which is fastened to a large bearing (not shown) may have locating fingers or ears which when approximately located across the center of the railroad track can locate the vehicle and align it properly with the railroad track. Such a plate or foot is known in the art as described in U.S. Pat. No. 4,520,735, incorporated herein in its entirety by reference.

Encroachment with adjacent railroad track is required should there be more than one set of tracks at the chosen location of vehicle transfer to rail. Traffic control or collision risks are negligible, however, because when this type of equipment is required to enter rail track for bridge inspection and maintenance or some other maintenance purpose, dates, times, location and train scheduling have been acquired and permission has been given.

In order to transfer from road mode to rail mode, the vehicle is positioned approximately perpendicularly over the railroad track with front road or rubber wheels 4 on one side of the track and rear road or rubber wheels 5,6 on the other side of the track and the plate or foot positioned across the two rails of the track. When first moved into this position, the rear end of the vehicle is as shown in FIG. 3, with rear steel rail wheels 3 in their raised position. Before lowering the plate or foot and rotating the vehicle into alignment with the railroad track, spring lock-out hook 14 must be extended by way of drive mechanism 13, so as to engage with bolster 15. Spring lock-out hook 14 remains locked in engagement with bolster 15 during the rail mode, so as to maintain the level horizontal arrangement of rear road or rubber wheels 5,6. Additionally, interlock device 18, which may be an electric switch as shown, is disposed on spring lock-out hook 14 and allows the actuation of drive mechanism 11 only after spring lockout hook 14 is engaged with bolster 15.

After spring lock-out hook 14 is engaged, the plate or foot is lowered into engagement with the rails of the railroad track and the vehicle is rotated manually or automatically on the plate or foot until the front steel rail wheels 2 and rear steel rail wheels 3 are aligned with the track wheels. Front steel rail wheels 2 are lowered by way of a drive mechanism (not shown) which swings front steel rail wheels 2 from a raised position to a lowered position. At the same time, rear steel rail wheels 3 are lowered into place by extending drive mechanism 11 to move links 9,10, thereby rotating trailing arm 7 around pivot 7a so that pivot point 11a comes in contact with over-center stop 28. At this point, the plate or foot is raised off of the rails, thereby lowering the front of the vehicle onto front steel rail wheels 2 and the rear of the vehicle onto rear steel rail wheels 3, so as to engage front steel rail wheels 2 and rear steel rail wheels 3 with the railroad track. Since links 9,10 are rotated into a position just past vertical, rear steel rail wheels 3 can be maintained in the lowered position and support the rear end of the vehicle. When rear steel rail wheels 3 are fully engaged with the railroad track, all loads supported at the rear of the vehicle are taken through links 9 and 10 and not through drive mechanism 11.

FIG. 4 shows the vehicle after the transfer from road mode to rail mode is complete. Front steel rail wheels 2 and rear steel rail wheels 3 are lowered into engagement with the railroad track, while front road or rubber wheels 4 and rear road or rubber wheels 5,6 are suspended above the ground and maintained at a predetermined distance 16 from chassis 1 by spring lock-out hook 14.

When it is desired to transfer the vehicle from rail mode back to road mode, the process described above is done in reverse. The foot or plate is lowered into engagement with the rails of the railroad track, lifting front steel rail wheels 2 and rear steel rail wheels 3 out of engagement with the railroad track. Front steel rail wheels 2 are raised by way of a drive mechanism (not shown) which swings front steel rail wheels 2 from a lowered position to a raised position. At the same time, rear steel rail wheels 3 are raised by retracting drive mechanism 11 to move links 9,10, thereby rotating trailing arm 7 around pivot 7a so that rear steel rail wheels 3 are raised into the road mode position. Then, the vehicle is rotated on the plate or foot into a position perpendicularly over the railroad track and the foot or plate is raised, thereby lowering front road or rubber wheels 4 and rear road or rubber wheels 5,6 into engagement with the ground. Finally, spring lock-out hook 14 is disengaged.

FIG. 3 shows the vehicle after the transfer from rail mode back to road mode is complete. Chassis 1 is supported by front road or rubber wheels 4 and rear road or rubber wheels 5,6, which are engaged with the ground, while front steel rail wheels 2 and rear steel rail wheels 3 are suspended above the ground and spring lock-out hook 14 is disengaged.

Alternatively, the raising and lowering front steel rail wheels 2 and rear steel rail wheels 3 can be done while the vehicle is not raised off the ground by the foot or plate. For example, when converting to rail mode, the plate or foot can be used to turn the vehicle into position over the railroad tracks and lower the vehicle onto front road or rubber wheels 4 and rear road or rubber wheels 5,6. Then front steel rail wheels 2 and rear steel rail wheels 3 can be lowered into engagement with the railroad track, thereby lifting front road or rubber wheels 4 and rear road or rubber wheels 5,6 off of the ground. When switching back to road mode, front steel rail wheels 2 and rear steel rail wheels 3 can be raised first, thereby lowering front road or rubber wheels 4 and rear road or rubber wheels 5,6 into engagement with the ground, and then the foot or plate can be lowered, in order to turn the vehicle perpendicular to the railroad tracks.

The plate or foot is not necessary, however, as the vehicle could also be driven next to the railroad tracks and then positioned so that front steel rail wheels 2 and rear steel rail wheels 3 can be lowered into engagement with the railroad tracks. Positioning the vehicle in this manner would require a repeated process of driving the vehicle forward and backward while steering front road or rubber wheels 4, in a similar manner as is used when parallel parking the vehicle.

In all of the above embodiments, it is important to ensure that spring lock-out hook 14 is locked in engagement with bolster 15 before rear steel rail wheels 3 are lowered, in order to maintain rear road or rubber wheels 5,6 at predetermined distance 16 from chassis 1 when raised off the ground and to reduce wear on universal joint 32.

While a number of embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A vehicle for operation on both road and railroad track provided with a wheeled chassis comprising:

a steerable first front wheel axle disposed on said chassis;

a first rear wheel differential axle with a universal joint output disposed on said chassis;

a second front wheel axle disposed on said chassis;

a second rear wheel differential axle with a universal joint input disposed on said chassis to the rear of said first rear wheel differential axle;

a front road wheel rotatably mounted on said steerable first front wheel axle;

a rear road wheel rotatably mounted on said first rear wheel differential axle;

a front rail wheel rotatably mounted on said second front wheel axle;

a rear rail wheel rotatably mounted on said second rear wheel differential axle;

a rail wheel drive shaft drivingly connected at one end to said universal joint output of said first rear wheel differential axle and at the other end to said universal joint input of said second rear wheel differential axle;

wherein said front rail wheel and said rear rail wheel are suspended horizontally from said wheeled chassis when said vehicle is being driven on a road;

wherein said front rail wheel and said rear rail wheel are engaged with a railroad track and said second rear wheel differential axle is driven by said first rear wheel differential axle through said rail wheel drive shaft, when said vehicle is driven on the railroad track; and wherein said steerable first front wheel axle and said second front wheel axle are disposed at the front of the vehicle and said first rear wheel differential and said second rear wheel differential axle are disposed at the rear of the vehicle and wherein said steerable first front wheel axle is disposed to the rear of said second front wheel axle and said first rear wheel differential axle is disposed in front of said second rear wheel differential axle.

2. The vehicle according to claim 1, further comprising:

means for braking said first rear wheel differential which also brakes said rear rail wheel.

3. A vehicle for operation on both road and railroad track provided with a wheeled chassis comprising:

a steerable first front wheel axle disposed on said chassis;

a first rear wheel differential axle with a universal joint output disposed on said chassis;

a second front wheel axle disposed on said chassis;

a second rear wheel differential axle with a universal joint input disposed on said chassis to the rear of said first rear wheel differential axle;

a third rear wheel differential axle with a universal joint input and a universal joint output disposed on said chassis in tandem with said first rear wheel differential axle and between said first rear wheel differential axle and said second rear wheel differential axle;

a front road wheel rotably mounted on said steerable first front wheel axle;

a first rear road wheel rotably mounted on said first rear wheel differential axle;

a second rear road wheel rotably mounted on said third rear wheel differential axle;

a front rail wheel rotably mounted on said second front wheel axle;

a rear rail wheel rotably mounted on said second rear wheel differential axle;

a tandem rear wheel drive shaft drivingly connected at one end to said universal joint output of said first rear wheel differential axle and at the other end to said universal joint input of said third rear wheel differential axle;

a rail wheel drive shaft drivingly connected at one end to said universal joint output of said third rear wheel differential axle and at the other end to said universal joint input of said second rear wheel differential axle;

a holding means disposed on said wheeled chassis;

wherein said third rear wheel differential axle is driven by said first rear wheel differential axle through said tandem rear wheel drive shaft;

wherein said front rail wheel and said rear rail wheel are suspended horizontally from said wheeled chassis when said vehicle is being driven on a road; and wherein said front rail wheel and said rear rail wheel are engaged with a railroad track, said holding means maintains said first rear wheel differential axle and said third rear wheel differential axle at a predetermined distance from said wheeled chassis so that said first rear road wheel and said second rear road wheel are suspended above the ground, and said second rear wheel differential axle is driven by said third rear wheel differential axle through said rail wheel drive shaft, when said vehicle is driven on the railroad track.

4. The vehicle according to claim 3, further comprising:

means for braking said first rear wheel differential which also brakes said rear rail wheel.

5. The vehicle according to claim 3 wherein said steerable first front wheel axle and said second front wheel axle are disposed at the front of the vehicle and said first rear wheel differential axle, said second rear wheel differential axle and said third rear wheel differential axle are disposed at the rear of the vehicle and wherein said steerable first front wheel axle is disposed to the rear of said second front wheel axle and said first rear wheel differential axle is disposed in front of said second rear wheel differential axle.

6. The vehicle according to claim 3 wherein said holding means is a spring lock-out hook disposed on said wheeled chassis between said first rear wheel differential axle and said third rear wheel differential axle.

7. The vehicle according to claim 3 further comprising:

a rear road wheel suspension system disposed between said chassis and said first and second road wheels; and an anti-dive means incorporated into a spring stack of said rear road wheel suspension system;

wherein said anti-dive means maintains said first and second rear road wheels substantially horizontally level when said vehicle is being driven on the railroad track.

8. A vehicle operated on both road and railroad track according to claim 7, wherein said anti-dive means is a leaf spring.

* * * * *